United States Patent
Nadgir et al.

(10) Patent No.: US 8,131,530 B2
(45) Date of Patent: Mar. 6, 2012

(54) MECHANISM FOR REALISTIC APPLICATION/NETWORK MODELING USING A WORKLOAD DESCRIPTION

(75) Inventors: Neelakanth Malhari Nadgir, Fremont, CA (US); Nitin Ramannavar, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 940 days.

(21) Appl. No.: 11/863,996

(22) Filed: Sep. 28, 2007

(65) Prior Publication Data

US 2009/0089038 A1    Apr. 2, 2009

(51) Int. Cl.
 *G06F 13/10* (2006.01)
(52) U.S. Cl. ............................ 703/21; 703/13
(58) Field of Classification Search .................... 703/13, 703/21; 717/136
See application file for complete search history.

(56) References Cited

U.S. PATENT DOCUMENTS

| | | | | |
|---|---|---|---|---|
| 5,303,166 A | * | 4/1994 | Amalfitano et al. | 702/186 |
| 5,446,874 A | * | 8/1995 | Waclawsky et al. | 714/1 |
| 5,790,425 A | * | 8/1998 | Wagle | 709/218 |
| 7,536,290 B1 | * | 5/2009 | Browning et al. | 703/21 |
| 7,945,657 B1 | * | 5/2011 | McDougall et al. | 709/224 |

OTHER PUBLICATIONS

Gates et al., "Iperf version 1.7.0", Iperf User Docs, Mar. 2003.*
Richard McDougall, "Filebench Tutorial", Sun Microsystems, 2004.*

* cited by examiner

*Primary Examiner* — Kamini S Shah
*Assistant Examiner* — Herng-Der Day
(74) *Attorney, Agent, or Firm* — Brooks Kushman P.C.

(57) ABSTRACT

A method for benchmarking a computer system comprises encoding a profile of the computer system in a readable medium to form an encoded computer readable medium. This profile is interpretable by a test server so that the test server is able to simulate the interaction between the system server and one or more system clients. The profile of the computer system includes a first set of tokens and data associated therewith configured to describe a workload to be executed by test server and a second set of tokens configured to describe actions taken by one or more test clients to simulate one or more system clients interacting with the system server.

14 Claims, 5 Drawing Sheets

Figure 1

| Token | Description |
| --- | --- |
| PROFILE | Workload that will be emulated by uPERF |
| NAME | Token to store the profile name or flowop name |
| GROUP | Set of transactions that will be executed by a fixed number of threads |
| DURATION | Time duration for which the transactions or flowop should be executed |
| NTHREADS | Signifies the number of threads per group defined in the workload profile |
| NPROCS | Signifies the number of processes per group defined in the workload profile |
| TRANSACTION | Set of flowops |
| ITERATIONS | Number of times the transactions to be executed |
| Flowop | Basic operation executed by the benchmark. Example: connect, read, etc. |
| CONNECT | Basic operation to perform a connect action. This operation creates the data-structures, memory and opens the communication link between the master and the slave(s) machines |
| DISCONNECT | Basic operation to perform a disconnect action. This operation frees up the data-structures, memory created during connect operation. Also, communication link between the master and the slave(s) machines are closed |
| WAIT | Basic operation to wait for the read, write, connect and disconnect flowop operations to complete |
| ACCEPT | Basic operation to accept the incoming connection request. This operation creates the data-structures, memory and opens the communication link on the non-master node |
| NOP | This flowop operation signifies no operation. |
| OPTIONS | Token to specify the options for the flowop operation |
| THINK | Flowop operation to do non-network application task |
| COUNT | Number of times the flowop to be executed |
| SUBTYPE | Option to specify the sub-type for a particular flowop |
| RDMA | Sub-type of the read or write operation for uDAPL protocol. RDMA (Remote Direct Memory Access) in uDAPL allows the applications to directly read or write the remote memory locations |
| POST | Sub-type of the read or write operation. This is related to UDAPL protocol which provides an option to specify the type of read or write to execute |
| DEQUEUE | Asynchronous wait operation in uDAPL protocol. This wait type is based on the poll method. |
| BUSY | Synchronous wait operation in uDAPL protocol. This wait type is based on the block method |
| POLL | Wait method to poll the completion of the flowop |

Figure 2A

| | |
|---|---|
| WAITTYPE | Option to select the wait function. Can be a blocking or polling wait. |
| WAITFOR | Option to specify what flowop operation to wait. Example: waitfor read |
| INLINE | Option to specify to wait for completion of each flowop immediately after submission. If not specified the wait will be executed after submitting a set of read/write flowops |
| PROTOCOL | Option to specify the protocol to use for connect, read, write and disconnect. |
| TCP | Select TCP protocol for connect, disconnect, read, write operations |
| UDP | Select UDP protocol for connect, disconnect, read, write operations |
| UDAPL | Select uDAPL protocol for connect, disconnect, read, write operations |
| ASYNC | Option to specify the flowop execution mode. By default all flowops are synchronous (wait until complete), however if flowop is specified as "Async" then the function block returns once the operation is pushed on the queue. The completion track is tracked through wait flowop. Example: RDMA post in uDAPL are async flowops. |
| TCP_NODELAY | Regular TCP/IP no delay option, packets are sent-out as soon as they arrive |
| CANFAIL | Option to specify that the flowop might fail, however still continue with the benchmark run |
| NON_BLOCKING | Implies that the flowop invoked is of non-blocking type |
| SIZE | Specifies the size of the packet to send/write or receive/read |
| CONN | Option to specify what connection ID or link to write or read from |
| COOKIE | Cookie for SSL |
| WNDSZ | Specify the TCP/IP socket buffer size |
| TIMEOUT | Option to specify the timeout |
| ENGINE | SSL Protocol engine |
| CIPHER | Parameter to setup cipher for SSL |
| METHOD | SSL Method |
| SENDFILE | Send a file using the sendfile system call |
| SENDFILEV | Send a group of files using the sendfilev system call |
| CONNECTION | Connection identifier for the connection link |
| CONNECTION_POOL | Pool of connection IDs |
| TIMEOUT | Option to specify the time-out for a particular flowop |
| DIR | Directory to read and write the files to/from |
| NFILES | Number of files in the vector for reading and writing |
| FIFO | Order to read write files |
| LIFO | Order to read write files |

Figure 2B

| Interactions | Description |
| --- | --- |
| HANDSHAKE_PHASE1 | Phase 1 handshake - pre connection operations |
| HANDSHAKE_PHASE2 | Phase 2 handshake - connection and post connection operations |
| HANDSHAKE_PHASE1_ACK | Phase 1 handshake - acknowledgment |
| HANDSHAKE_PHASE2_ACK | Phase 2 handshake - acknowledgment |
| SLAVE_INFO_T | Data structure to hold all the workload information |
| GET_VERSION | Interaction to get the version number |
| BAD_VERSION | Interaction to report bad version number |
| SUPPORTED_PROTOCOLS | List of supported protocols |
| SEND_WORKLIST | Method to send a list of worklist to the SUT |
| GET_WORKLIST | Method to receive a list of worklist to the SUT |
| GOODBYE | Interaction to report run completion |
| GOODBYE_INFO | Interaction to report info messages |
| GOODBYE_ERROR | Interaction to report error messages |
| GOODBYE_WARNING | Interaction to report the warning |
| UPERF_CMD_NEXT_TXN | Command to inform slave to move to the next command |
| UPERF_CMD_ABORT | Command to inform slave to abort the run |
| UPERF_CMD_SEND_STATS | Interaction to collect the statistics |

MECHANISM FOR REALISTIC APPLICATION/NETWORK MODELING USING A WORKLOAD DESCRIPTION

BACKGROUND OF THE INVENTION

1. Field of the Invention

The present invention is related to methodology for benchmarking computer system interacting over a network.

2. Background Art

Network performance benchmarks are invaluable tools for providing unbiased and valid information that can be used to evaluate and analyze the performance of various networks. Such performance benchmarking is helpful for a variety of purposes. For example, benchmarks allow system and application performance to be explained and/or predicted. This can be particularly useful for decision making while procuring large-scale systems.

The plethora of network protocols and technologies makes it difficult to find an appropriate benchmark for a particular situation. Examples of network technologies include technologies such as 1G, 10G, and protocols such as UDP, TCP, and UDAPL UDAPL. Benchmarks such as iPERF and netbench today are used by many developers, researchers and customers to evaluate and analyze the performance of the network technologies and protocols. Most of these benchmarks are targeted to a single objective. For example iPERF is basically used to provide performance data for TCP/IP, which makes the benchmark very specific in nature. Also the load that they generate is not always quite similar to the application's work load, thus making the data unrealistic.

Filebench, basically a benchmark framework for local file systems, is the first benchmark to introduce the concept of generic framework and application based analysis. The simple idea behind filebench, is that we can represent any application using process, threads, transactions and operations. Hence we could generate a very realistic work load. The data obtained from this are not only useful to analyze the performance but will also help us resolve the bottleneck with existing applications. For new applications that are yet to be designed, it gives a performance insight that is very helpful to design better performance efficient applications. Basically based on the concept that most of the benchmarks share similar objectives and the way of achieving them, filebench is definitely the best thought conceived and realized idea, in the field of benchmarks.

Although these prior art benchmark technologies work reasonably well, it is often the case that for each new application with novel requirements, new bench marking methodology needs to be implemented. The prior art benchmarks tend to be somewhat unrealistic, specific, and inflexible. These drawbacks not only hinder the performance analysis but also make it hard to maintain and support these benchmarks. It is often infeasible to compare the data from different benchmark technologies. Moreover, as requirements or applications change, it is typically necessary to re-implement the benchmarking tool. This often results in a significant amount of time being devoted to implementation resulting in added expense. It would be more desirable to have such resources devoted to performance analysis.

Accordingly, for at least these reasons, there is need for improved network benchmark technologies that are flexible and easy to implement.

SUMMARY OF THE INVENTION

The present invention solves one or more problems of the prior art by providing a method of modeling an application workload in a network of computer systems comprising a server and one or more clients that are communicating with the server. The method comprises the application workload profile being encoded in a computer readable form (onto computer readable medium) to form an encoded computer readable medium. This profile is interpretable by a test server so that the test server is able to simulate the interaction between the system server and one or more system clients. The workload profile includes a first set of tokens and data associated therewith configured to describe a workload to be executed by a test server. The first set of tokens and data associated therewith allows the test server to simulate the system server interacting with the one or more system clients. The profile of the computer system may also include a second set of tokens configured to describe actions taken by one or more test clients to simulate one or more system clients interacting with the system server. The test clients execute a program that receives instructions from the test server. The test server translates the second set of tokens into the instructions that are transmitted to the test clients and interpreted by the test client program. The present embodiment amounts to a framework for constructing benchmarks which is easy to maintain, generic and not very complicated to implement. Moreover, it provides a way to represent applications that use mixed protocols. The framework of the present embodiment allows comparisons between technologies or protocols to be made with accurate performance statistics being obtainable.

The present embodiment provides application based load generation and application based performance analysis that is more realistic than the methods of the prior art. Moreover, the present embodiment allows resolution of bottlenecks associated with current applications allowing design of performance efficient applications. The present embodiment also provides a unified framework that is simple to extend to new or other existing protocols.

In another embodiment, a computer readable medium encoded with the instructions to implement the method set forth above is provided.

BRIEF DESCRIPTION OF THE DRAWINGS

FIGS. 2A and 2B provide Table 1 which includes examples of descriptive tokens used in the uPERF framework;

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

In a variation of the present embodiment, the methods are implemented by a computer program comprising computer program code or application code. This application code or computer program code may be embodied in any form of a computer program product. A computer program product comprises a medium configured to store or transport this computer-readable code, or in which this computer-readable code may be embedded. Examples of computer program products, include but are not limited to, CD-ROM discs, ROM cards, floppy discs, magnetic tapes, computer hard drives, servers on a network, and carrier waves. Thus, the processes and/or interfaces can be implemented by a computer program comprising computer program code or application code.

Figure 1:
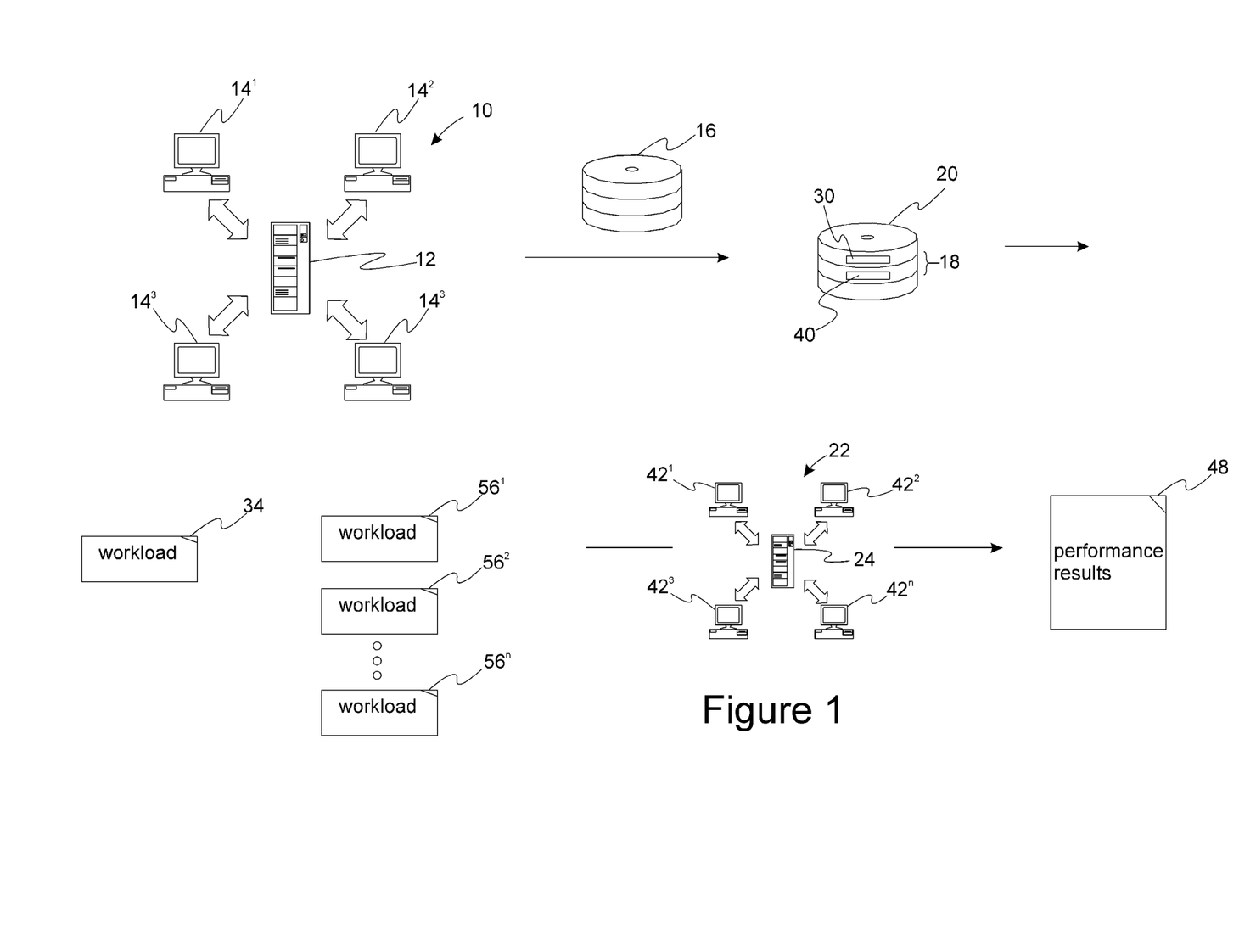
FIG. 1 is a schematic flowchart of a computer system communicating over a network that is modeled by the uPERF framework.

With reference to FIG. 1, the method of this embodiment is described. FIG. 1 provides a schematic flowchart of a computer system communicating over a network that is modeled by the uPERF framework. Such a system is typically referred to as a system under test ("SUT"). Computer system 10 includes system server(s) 12 communicating over a network with one or more system clients 14" (for example, 14$^1$, 14$^2$, 14$^3$, and 14$^4$ as depicted in FIG. 1). The method of this embodiment includes a step in which profile 18 of computer system 10 is encoded onto computer readable medium 16 to form encoded computer readable medium 20. Profile 18 is interpretable by test server 24 of test system 22 so that test server 24 simulates the interaction between system server 12 and one or more system clients 14".

Profile 18 of computer system 10 contained within encoded computer readable medium 20 includes a first set of tokens 30 and data associated therewith configured to define workloads 34 to be executed by test server 24. First set of tokens 30 and data associated therewith allows test server 24 to simulate system server 12 interacting with the one or more system clients 14".

In a variation of the present embodiment, profile 18 also includes second set of tokens 40 configured to describe actions taken by one or more test clients 42" to simulate one or more system clients 14" interacting with system server 12. Test clients 42" execute a program that receives instructions from test server 24. Test server 24 translates the second set of tokens 40 into the instructions that are transmitted to test clients 42" and interpreted by the program running on test clients 42".

Figure 3:
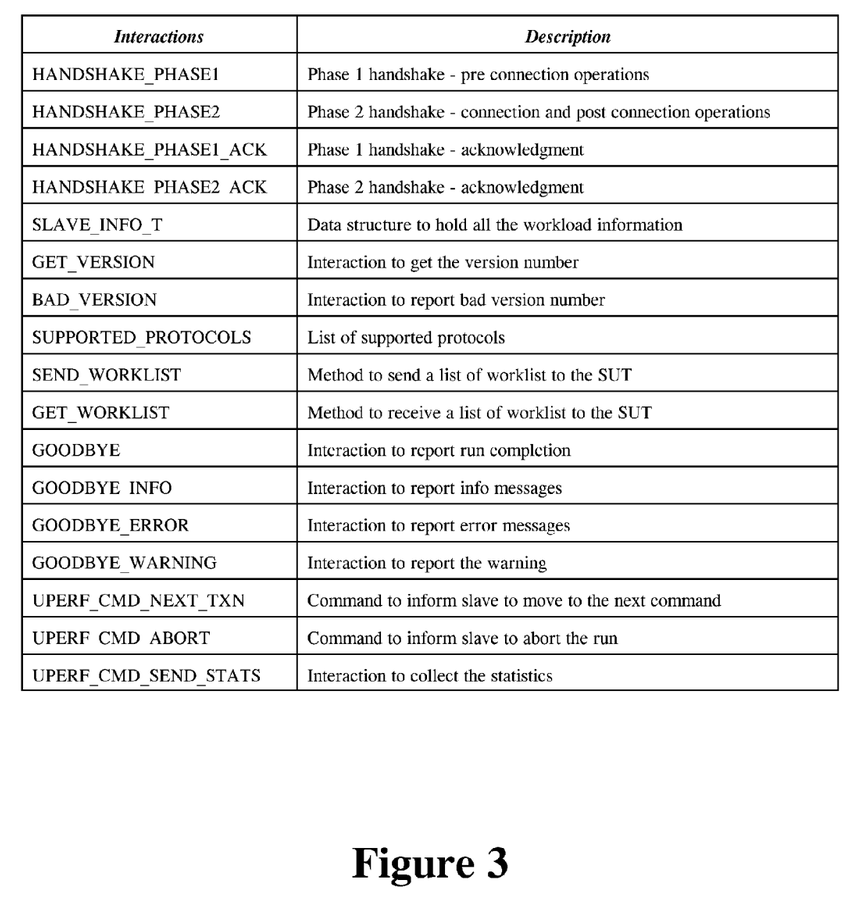
FIG. 3 provides Table 2 which includes examples of interaction tokens used in the uPERF framework.

FIGS. 2A, 2B, and 3 provide Tables showing examples of tokens that may be used for the first and second set of tokens.

FIGS. 2A and 2B provide Table 1 which includes examples of descriptive tokens used in the uPERF framework. FIG. 3 provides Table 2 which includes examples of interaction tokens used in the uPERF framework.

In one embodiment, the first set and second set of tokens each independently include one or more tokens selected from the group consisting of tokens that describe a set of flowops. In addition, the first set and second set of tokens each independently include one or more tokens selected from the group consisting of tokens that describe the set of transactions that will be executed by a fixed number of threads, the time duration for which the transactions or flowop should be executed, the number of threads per group defined in the workload profile, and the number of processes per group defined in the workload profile.

In one embodiment, the first set and second set of tokens each independently include one or more tokens selected from the group consisting of tokens that describe the number of times the transactions are to be executed, operations to perform a connect action, an operation to perform a disconnect action, an operation to accept the incoming connection request, and options for flowop operations.

In one embodiment, the first set and second set of tokens each independently include one or more tokens selected from the group consisting of tokens that describe a flowop operation to do a non-network application task, the number of times the flowop is to be executed, an option to specify the sub-type for a particular flowop, a sub-type of the read or write operation for the uDAPL protocol, and a sub-type of the read or write operation.

As also illustrated in FIGS. 2A, 2B, and 3, the first set and second set of tokens may each independently include one or more tokens selected from the group consisting of tokens that describe an asynchronous wait operation in uDAPL protocol, a synchronous wait operation in uDAPL protocol, a "wait" method to poll the completion of the flowop, an option to select the wait function, an option to specify what flowop operation to wait, an option to specify to wait for completion of each flowop immediately after submission, and an option to specify the protocol to use for connect, read, write and disconnect.

In one embodiment, the first set and second set of tokens each independently include one or more tokens selected from the group consisting of tokens that describe TCP protocols for connect, disconnect, read, and write operations; UDP protocols for connect, disconnect, read, and write operations; uDAPL protocols for connect, disconnect, read, and write operations; an option to specify the flowop execution mode, and combinations thereof.

In one embodiment the first set and second set of tokens each independently include one or more tokens selected from the group consisting of tokens that describe a regular TCP/IP connection with a no delay option, an option to specify that the flowop might fail, invoking of a non-blocking type flowop, the size of the packet to send/write or receive/read, an option that specifies a connection ID or link to write or read from, an SSL cookie, a TCP/IP socket buffer size, a timeout occurrence, and combinations thereof.

In various embodiments, the first set and second set of tokens each independently include one or more tokens selected from the group consisting of tokens that describe interactions related to a handshake connection and post connection operations, handshake acknowledgment, a data structure to hold all the workload information, a version number, an interaction to report a bad version number, supported protocols, sending or receiving a work list, reporting run completion, reporting information messages, reporting error messages, reporting a warning, a command to inform a slave to move to the next command, a command to inform a slave to abort the run, and combinations thereof.

As set forth above, the framework of the present invention includes one or more sets of tokens with related data. As such the framework is advantageously constructed as a high level language. In one refinement, the framework may be implemented as an XML language. An XML implementation is particularly useful since XML is extensible thereby allowing easy adaptation to a specific user's requirements. In one refinement, the uPERF framework conforms to the specification set forth in Extensible Markup Language (XML) 1.1 (Second Edition) W3C Recommendation 16 Aug. 2006, edited in place 29 Sep. 2006. The entire disclosure of this specification is incorporated by reference in its entirety.

In another variation of the present embodiment, the method further comprises parsing profile 18 to form a set of workload activity descriptions 56″ for system server 12 and one or more system clients 14″. Profile 18 is typically described in terms of thread groups, threads, transactions and operations. Since the server may be communicating with multiple hosts, using multiple protocols, and using arbitrary profiles, analysis of the clients' functionality may be unobvious.

In a refinement of this variation, the following method is employed to parse profile 18. Opposite behavior for each flowop is defined. As used herein, the term "flowop" means a basic operation executed by a benchmark (e.g. connect, read, write, close, and the like.) For example, the opposite of read is write, the opposite of connect is accept, and the opposite of close is close. The profile is then parsed to list out the clients that will be participating in this benchmark. For each client in the profile, connection is made with the uPERF program already running on the client using TCP (called control connection). Next, the "opposite" of the profile is determined, making sure to remove operations not specific to this client. This modified profile is then converted to the endian format of the client. This modified profile is then transmitted to the client. Port information is exchanged (this information is used to get port numbers where the exchanges will happen).

In a further refinement of this variations test server 24 drives one or more test clients 42″ to execute a corresponding workload 56″. Performance results 48 are subsequently collected by test server 24.

It should be appreciated that the uPERF framework as set forth above is not a benchmark, but a framework for forming benchmarks. In a variation, the uPERF framework is implemented such that any communication protocol API set can be reduced to four main API's open, close, read and write, and in some cases wait. Accordingly, as long as the protocol API set can be abstracted to these operations, uPERF may be used to conduct performance analysis on that particular protocol. Examples of protocols that are compatible with uPERF include, but are not limited to, TCP, UDP, SCTP, SSL, and UDAPL. It should be appreciated that the uPERF framework supports both reliable protocols such as TCP as well as unreliable protocols, such as, UDP. The uPERF framework supports both kinds of protocols without distinguishing between them. The presently described feature also allows for new protocols to be added for benchmarking.

In a variation of the present embodiment, the uPERF framework allows the performance of applications involving multiple protocols to be studied. For example, the uPERF framework allows the performance of popular messaging middleware in certain middleware products, messages between peers are exchanged via TCP via a "master peer." Mater peers then exchange messages with other master peers using UDP. Moreover, since the analysis is analogous across all protocols, comparison is simplified. For example, uDAPL on IB may be compared with 10G by the methods of the present variation.

In another variation of the present embodiment, RDMA operations may be analyzed. RDMA read or write can directly access remote-system's memory without the need for a remote-counter operation. This behavior is a deviation from how other network protocols such as TCP, UDP function. uPERF's "nop" flowop operation in combination with read/write (read-nop or write-nop) enables modeling and benchmarking of protocols such as RDMA that are unique and different.

In yet another variation of the present invention, the profile further includes a "wait" operation that handles asynchronous operations. In a refinement of this variation, the "wait" operation provides a "wait" facility for outstanding operations.

In still another variation of the present embodiment, the profile includes a synchronization mechanism to ensure the parallel execution of the threads. In a refinement, the synchronization mechanism uses a conditional wait in combination with a mutex lock.

In another embodiment, a computer readable medium encoded with the instructions to implement the method set forth above is provided. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

In still another embodiment of the present invention, a system implementing the method set forth above is provided. With reference to FIG. 1, the system of this embodiment is test system 22 which includes test server 24 and one or more test clients 42″. The details of the system are set forth above in connection with the description of FIG. 1.

The following examples illustrate the various embodiments of the present invention. Those skilled in the art will recognize many variations that are within the spirit of the present invention and scope of the claims.

Consider the following customer specification—a server accepts 10 connections, reads 256 bytes, writes 1024 bytes 10,000 times before closing the application.

If a prior art approach has used 2 programs it would have to be written (one for the server and one for the client). Table 3 summarizes the functionality of these programs.

TABLE 3

| Modeling programs | |
| --- | --- |
| server program | 1. accept 10 connections from client<br>2. reads 256 bytes, writes 1024 bytes 10,000 times.<br>3. close connections |
| client program | 1. open 10 connections to server<br>2. write 256 bytes, read 1024 bytes 10,000 times<br>3. close connections |

In the uPERP framework of the present invention, the customer's application is described as follows:

```
<group nthreads = 10>
   <transaction iterations="1">
      <flowop type="accept" options="remotehost=hosta protocol=tcp">
   </transaction>
   <transaction iterations="10000">
      <flowop type="read" options="size=256" />
      <flowop type="write" options="size=1024" />
   </transaction>
   <transaction iterations="1">
      <flowop type="disconnect" />
   </transaction>
</group>
```

The customer's description is successfully transformed into a profile. Note that this profile is only specified for the "server." No mention is made about the client (except for its hostname). In the prior art methodology, the client will do something specific to what the server does. For example, if the server reads 256 bytes, the client writes 256 bytes. Opposite behavior for each flowop for this example is determined as set forth above. For the profile set forth above, the modified/opposite profile is as follows:

```
<group nthreads = 10>
   <transaction iterations="1">
      <flowop type="connect" options="remotehost=server protocol=tcp">
   </transaction>
   <transaction iterations="10000">
      <flowop type="write" options="size=256" />
      <flowop type="read" options="size=1024" />
   </transaction>
   <transaction iterations="1">
      <flowop type="disconnect" />
   </transaction>
</group>
```

It should be appreciated that profiles can be quite different. For example, if the customer wanted to know how his application would perform if he uses UDP instead of TCP, the same profile is used with TCP changed to UDP. The test is then rerun.

An example profile to measure connection setup/teardown is as follows.

```
<profile name="connect-test">
   <group nthreads="10">
      <transaction iterations="1000">
         <flowop type="connect" options="remotehost=foobar protocol=tcp"/>
         <flowop type="disconnect"/>
      </transaction>
   </group>
</profile>
```

Once the uPERF program is started on the client machines, there is no need to ever restart because the program dynamically executes new profiles whenever requested.

In a sense, it is as if old benchmarks only execute a "fixed" profile, whereas uPERF provides the facility to execute arbitrary profiles.

Figure 4:
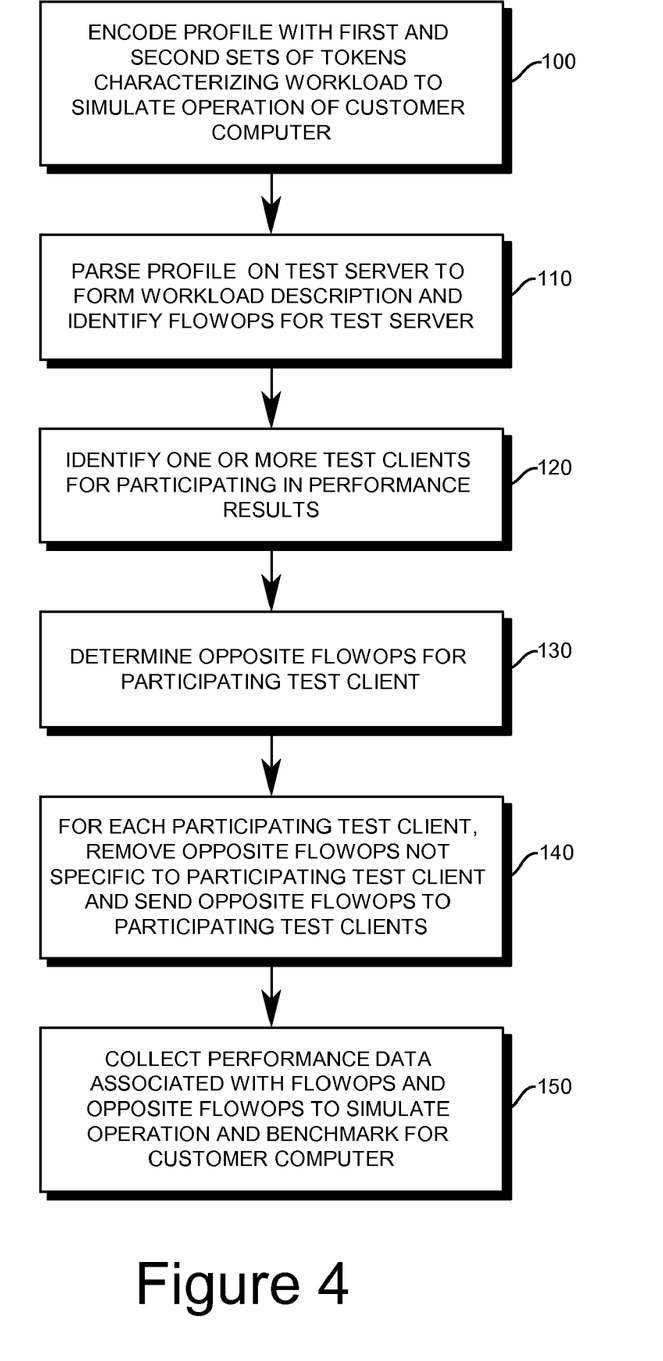
FIG. 4 is a flow chart illustrating operation of a computer system communicating over a network that is modeled by the uPERF framework.

FIG. 4 is a flow chart illustrating operation of one embodiment of a computer system communicating over a network that is modeled by the uPERF framework. As shown in FIG. 4, a method of modeling a computer system having a system server and one or more system clients in communication with the system server to provide benchmarking of the computer system using a test system having a test server and one or more test clients includes encoding a profile of the computer system onto a computer readable medium as represented by block 100. The profile is interpretable by the test server so that the test server simulates interaction between the system server and the one or more system clients. As also illustrated in block 100, the profile includes a first set of tokens and data associated therewith configured to describe a workload to be executed by the test server to simulate the system server interacting with the one or more system clients, and a second set of tokens configured to describe actions taken by the one or more test clients to simulate interaction of the one or more system clients interaction with the system server. The test clients execute a program that receives instructions from the test server, wherein the test server translates the second set of tokens into the instructions that are transmitted to the test clients and interpreted by the program.

With continuing reference to FIG. 4, the method includes parsing the profile to form a workload activity description having a plurality of flowops for the test server and the one or more test clients as represented by block 110. Parsing the profile may include identifying one or more test clients for participating in the performance results as represented by block 120 and determining opposite flowops for each participating test client as represented by block 130. The method may also include, for each participating test client, removing opposite flowops not specific to the participating test client and sending the opposite flowops to corresponding test clients as represented by block 140. The method may also include collecting performance results for the test server and the one or more test clients based on the profile to provide a benchmark for the computer system as represented by block 150.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of modeling a computer system having a system server and one or more system clients in communication with the system server to provide benchmarking of the computer system using a test system having a test server and one or more test clients, the method comprising:

encoding a profile of the computer system onto a computer readable medium, the profile being interpretable by the test server so that the test server simulates interaction between the system server and the one or more system clients, the profile including:

a first set of tokens and data associated therewith configured to describe a workload to be executed by the test server to simulate the system server interacting with the one or more system clients;

a second set of tokens configured to describe actions taken by the one or more test clients to simulate interaction of the one or more system clients with the system server, the test clients executing a program that receives instructions from the test server, wherein the test server translates the second set of tokens into the instructions that are transmitted to the test clients and interpreted by the program;

parsing the profile to form a workload activity description having a plurality of flowops for the test server and the one or more test clients; and collecting performance results for the test server and the one or more test clients based on the profile to provide a benchmark for the computer system;

wherein parsing the profile includes identifying the one or more test clients for participating in the performance results and wherein for each participating test client, determining an opposite flowop for each of the plurality of flowops in the profile and removing opposite flowops that are not specific to the participating test client, and sending the remaining opposite flowops to the participating test client.

2. The method of claim 1 wherein the profile of the computer system includes information related to processes, threads, transactions, and operations running on the system server and/or the one or more system clients.

3. The method of claim 1 wherein the profile of the computer system includes information related to multiple network communication protocols.

4. The method of claim 1 wherein the first set and second set of tokens include tokens that describe actions related to opening, closing, reading and writing to communication ports.

5. The method of claim 1 wherein the first set and second set of tokens each independently include one or more tokens selected from the group consisting of tokens that describe interactions related to handshake connection and post connection operations.

6. A non-transitory computer readable medium encoded with a high level language description of a computer system having a system server interacting with one or more system clients, the high level language description comprising:

a first set of tokens configured to describe actions to be taken by a test server to simulate the system server interacting with the one or more system clients; and a second set of tokens configured to describe actions taken by one or more test clients to simulate the one or more system clients, the test clients executing a program that receives instructions from the test server, the test server translating the second set of tokens into the instructions that are transmitted to the one or more test clients;

wherein the computer readable medium further comprises instructions for parsing the high level language description to form a workload activity description having a plurality of flowops for the test server and the test clients, the instructions for parsing including instructions for identifying the one or more test clients for participating in performance testing, instructions for determining opposite flowops for at least one participating test client based on the plurality of flowops, and instructions for converting the opposite flowops to an endian format associated with the at least one participating test client.

7. The method of claim 6 further comprising sending the opposite flowops to the at least one participating test client.

8. The method of claim 7 further comprising:

for each participating test client, exchanging communication port information with the test server before executing the opposite flowops.

9. A method for benchmarking performance of computer software on a customer computer network having a customer server in communication with at least one customer client using a test computer system having a test server in communication with at least one test client, the method comprising:

encoding a profile containing first and second sets of tokens and associated data characterizing a workload for the computer software, the profile interpretable by the test server to simulate operation of the computer software on the customer computer network;

parsing the profile on the test server to identify a plurality of flowops for at least the test server;

determining opposite flowops for the plurality of flowops for the at least one test client;

executing the flowops using the test server and the opposite flowops using the at least one test client;

collecting performance data associated with executing the flowops on the test server and the opposite flowops on the at least one test client to simulate operation of the computer software on the customer computer network and benchmark the computer software.

10. The method of claim 9 wherein the first and second sets of tokens include descriptive tokens and interactive tokens.

11. The method of claim 9 further comprising removing opposite flowops that are not associated with a particular test client before sending the opposite flowops to the particular test client.

12. The method of claim 9 further comprising converting the opposite flowops to an endian format associated with a particular test client.

13. The method of claim 9 further comprising parsing the profile to identify the at least one test client.

14. The method of claim 9 wherein the profile includes information related to multiple network communication protocols.

* * * * *